United States Patent [19]

Layher

[11] Patent Number: 4,543,126
[45] Date of Patent: Sep. 24, 1985

[54] METHOD OF AND ARRANGEMENT FOR DETERMINING LOADING CAPACITY OF COATING ELEMENTS FOR STRUCTURES

[76] Inventor: Eberhard Layher, Blankenhornstrasse 17, D-7129 Güglingen-Eibensbach Wtbg., Fed. Rep. of Germany

[21] Appl. No.: 540,609

[22] Filed: Oct. 7, 1983

[30] Foreign Application Priority Data

Oct. 8, 1982 [DE] Fed. Rep. of Germany ....... 3237259

[51] Int. Cl.$^4$ .............................................. G01N 3/20
[52] U.S. Cl. ..................................................... 73/852
[58] Field of Search ................. 73/852, 849, 850, 851, 73/862.53, 862.62; 340/665

[56] References Cited

U.S. PATENT DOCUMENTS 3,057,191 10/1962 Holloway ............................ 73/849

FOREIGN PATENT DOCUMENTS 127155 4/1948 Australia ............................... 73/853

Primary Examiner—Jerry W. Myracle
Attorney, Agent, or Firm—Michael J. Striker

[57] ABSTRACT

An arrangement and method for determining loading capacity of coating elements for structures has a pressure generating element, a force bar to be placed on the coating element to be tested, a two-armed lever with an axle supported on the force bar, one arm articulately connected with the pressure generating element, and the other arm on which a moment opposite to the moment on the one arm acts, and a free end of the other arm actuates a switching device for the pressure generating element.

20 Claims, 2 Drawing Figures ically reversing the pressure generating element. The elastic deformation of the coating element which takes place under the action of the adjusted force of the second lever arm can be continuously read on a respective scale and shows the value of the loading capacity of this coating element. Such a scale can be for example arranged so that the reading can be performed with the aid of a mark provided on a member which transmits pressure to the lever, for example a piston rod.

METHOD OF AND ARRANGEMENT FOR DETERMINING LOADING CAPACITY OF COATING ELEMENTS FOR STRUCTURES

BACKGROUND OF THE INVENTION

The present invention relates to a method of and an arrangement for determining loading capacity of coating elements for structures, for examples boards or frame plates, generally made of wood.

The evaluation of wood to be used has been performed visually or in other words from purely optical points. Pine wood which mainly is in question is subdivided into four quality classes in accordance with graining, irregular growth, boughs, color, etc. This type of evaluation requires, however, a high experience and extensive special knowledge which properties are not always available. In addition foreign wood is to be worked in increasing quantities and its properties differ from conventional native wood types so that a reliable determination of its loading capacity in references to its condition is not possible in practice.

SUMMARY OF THE INVENTION

Accordingly it is an object of the present invention to provide a method of and an arrangement for determining loading capacity of coating elements for structures, which avoid the disadvantages of the prior art.

More particularly, it is an object of the present invention to provide a method of and an arrangement for determining loading capacity of coating elements for structures in accordance with which determination of the loading capacity of coating elements of wood, such as boards or frame panels can be performed in a simple manner.

In keeping with these objects and with others which will become apparent hereinafter, one features of the present invention resides, briefly stated, in a method in accordance with which a force bar is placed along a transverse central line of a coating element to be tested and supported at its both ends, the force bar holds a pivot axle of a two-armed lever, with the aid of one arm of this lever a moment continuously growing from zero is generated hydraulically, pneumatically or electromechanically, the second arm of the lever serves for generating a counter moment which is fixedly adjustable in correspondence to the permissible maximum loading of the coating elements, and with maintaining a permissible bending of the coating element the attainment of the permissible maximum loading is recorded or the exceeding of the maximum permissible bending of the coating element to be recorded.

Another feature of the present invention is an arrangement which has a support, an electrically, hydraulically or pneumatically actuated pressure generating element articulately connected with the end of one arm of a two-armed lever, the pivot axle of the lever is arranged on a force bar which is placed on the coating element to be tested transverse to its longitudinal axis, on the second arm of the lever an adjustable moment acts which is opposite to the moment produced by the pressure generating element, and a switching device for the pressure generating element is actuated by the free end of the second arm.

In accordance with such method and in such arrangement, a horizontally arranged coating element to be tested, which is supported at its both ends on which the force bar lies on a central axis extending normal to the longitudinal axis, is elastically deformed under the action of the pressure generating element until the moment acting by the pressure on one lever arm is equal to the moment produced on the second lever arm by the force applied to the second lever arm and adjusted in correspondence with the testing loading. At this moment the lever turns to its position of equilibrium and a switching device located at the free end of the second lever arm acts for stopping and subsequently automatically reversing the pressure generating element. The elastic deformation of the coating element which takes place under the action of the adjusted force of the second lever arm can be continuously read on a respective scale and shows the value of the loading capacity of this coating element. Such a scale can be for example arranged so that the reading can be performed with the aid of a mark provided on a member which transmits pressure to the lever, for example a piston rod.

For simplifying the evaluation of the testing results, it is possible in accordance with a further feature of the present invention to determine a path covered by a pressure transmitting member, for example a piston rod, by two adjustable limiting switches. During exceeding of the maximum permissible elastic deformation of the coating element a lower switch actuates the stoppage of the pressure generating element, whereas an upper switch during reversing of the pressure transmitting member determines the zero or initial position of the arrangement. When no reverse via the switch on the second lever arm takes place or in other words when the elastic deformation of the coating element exceeds the permissible value, the arrangement is stopped and by its remaining in the attained position, the tested element is recognized as nonuseable. The reverse is then performed by manual actuation of the switch or a special reverse switch. It should be understood that also other possibilities can take place.

For generating of the adjustable moment which acts on the second arm of the two-armed lever, there are also various possibilities. For example, a sliding weight displaceable on the second lever arm can serve for adjusting the moment which acts in an opposite direction to the moment actuated by the pressure generating element. Also, for this purpose, a spring with adjustable tension can be used on the second arm of the lever.

For supporting the coating elements to be tested, the support of the arrangement can be provided with a horizontal rectangular frame, and transverse bars can be mounted on the frame and composed for example of shaped steel members. The distance between the transverse bars can be selectively adjustable in correspondence with the length of the coating elements to be tested.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
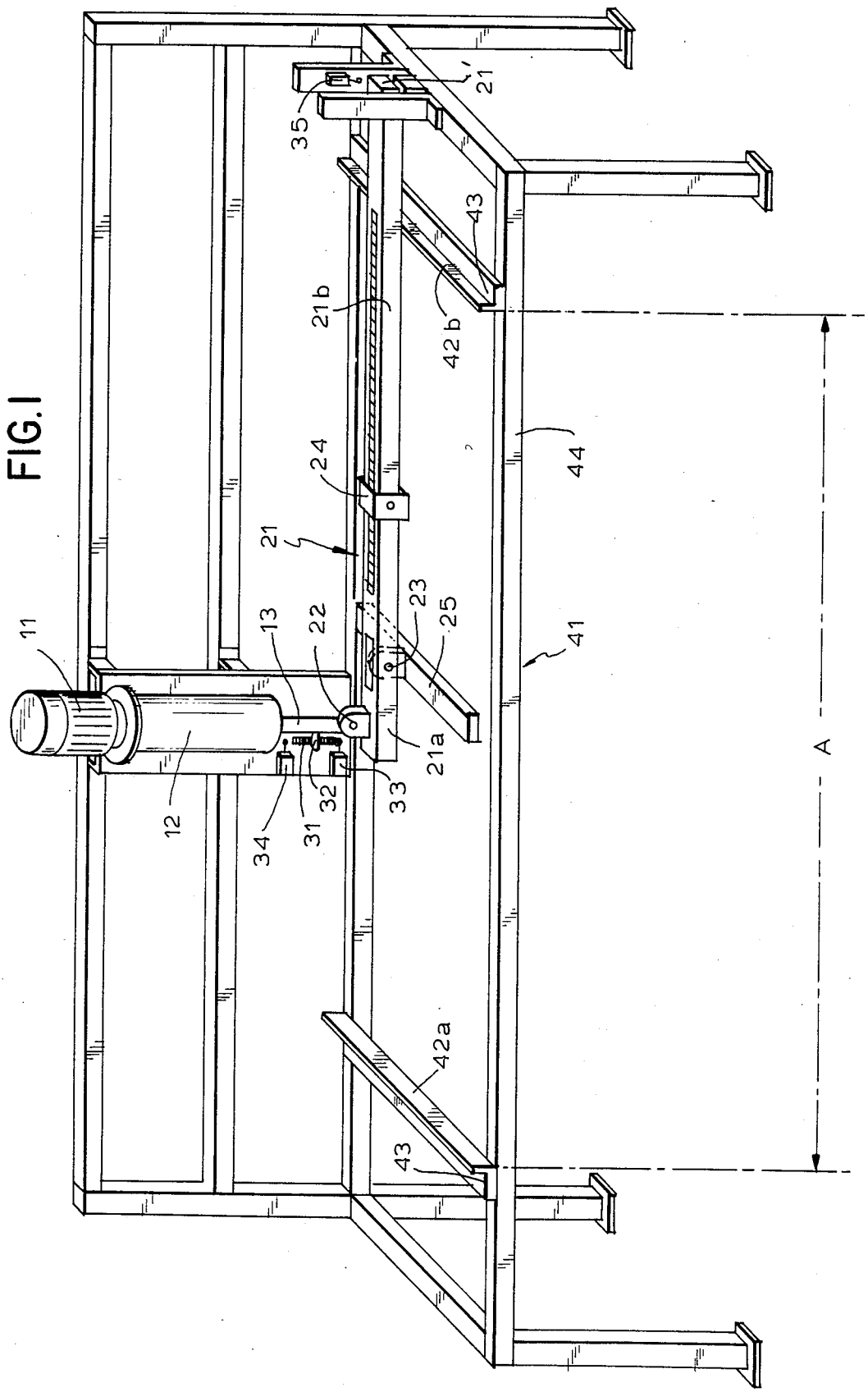
FIG. 1 of the drawing is a perspective view showing an arrangement for determining loading capacity of coating elements for structures, in accordance with the present invention.

An arrangement for determining a loading capacity of coating elements shown in FIG. 1 includes an electric motor which is identified with reference numeral 11 and displaces a spindle 13 arranged in a housing 12 vertically downwardly or upwardly, depending upon the direction of rotation of the electric motor. In the shown example the electric motor 11 serves as a pressure generating element. The spindle 13 has a lower end which is articulately connected by a pin 22 with one arm 21a of a two-armed lever 21. A pivot axle 23 of the lever 21 is supported in a support which is mounted on a force bar 25.

A sliding weight 24 is provided on a second arm 21b of the two-armed lever 21 and displaces longitudinally on the same. The sliding weight 24 serves for producing a torque in accordance with the principle of the Roman balance. Advantageously the arm 21b of the two-armed lever 21 is provided with a respective scale, so that for example, the pressure acting upon the force bar 25 and corresponding to the torque produced by the sliding weight 24 and the arm 21b of the lever 21 can be directly read on this scale.

The arrangement which is a testing apparatus is mounted on a support 41 which is provided with a horizontal frame 44. A coating element to be tested, for example a board or a frame panel is placed on the frame 44 for conducting the tests. During the tests the force bar 25 lies on the coating element to be tested (not shown), and the ends of the coating element are supported on both supporting bars 42a and 42b or suspended on the same. The supporting bars 42a and 42b can be formed for example of U-shaped or L-shaped members. They are fixed, for example by clamping screws 43 on the horizontal frame and their distance A from one another can be adjusted so as to correspond to the respective length of the coating element to be tested. It is to be understood that the supporting bars 42a and 42b should be arranged so that the force bar 25 lies above the central axis of symmetry extending transverse to the longitudinal direction of the coating element between the supporting bars.

For conducting the test, the element to be tested is placed between the supporting bars 42a and 42b adjusted to the required distance A. When the element to be tested is a frame panel provided at its end side with claws for hanging, the claws are suspended on the flanges of the upwardly open U-shaped members or the upwardly extending legs of the L-shaped members which form the supporting bars 42a and 42b. When the supporting bars are formed by the L-shaped members they are arranged so that the upwardly extending legs are located at their sides facing toward one another. When the element to be tested is a simple board, L-shaped members are used for the supporting bars 42a and 42b, which are arranged so that the upwardly extending legs are located at sides facing away from one another. Thereby the board can be placed with its ends onto the horizontally extending legs and abut with its end sides against the upwardly extending legs.

In the initial position of the testing apparatus, the two-armed lever 21 is inclined, because of the sliding weight 24 adjusted in correspondence with the required testing pressure, so that its end 21' is located under the horizontal extending through its pivot axle 23 and corresponding to the position of equilibrium of the lever 21. After switching on of the pressure generating element which in the selected example is the electric motor 11, an increasing moment is produced via the pressure applying element which in this case is the spindle 13 and via the pin 22. This increasing moment is applied onto the arm 21a of the lever 21 and acts via the force bar 25 upon the coating element with a respective pressure. The coating element bends under the growing pressure with increasing value until the upwardly acting force which corresponds to its elastic deformation is sufficient to produce a moment which is equal to and counteracts the moment acting because of the sliding weight 24. At this point the two-armed lever 21 turns to its position of equilibrium and actuates with its free end 21' a switch 35 which stops the motor 11, reverses its direction of rotation and returns the testing apparatus to its initial position.

For determining the value of the respective elastic deformation of the coating element, the pressure applying member or the spindle 13 is provided with an indicator formed as a pin 32. The pin 32 is associated with a scale 31 which is provided on a supporting plate for supporting the electric motor 11 and the housing 12. The pin 32 in cooperation with the scale 31 allows to read the path covered by the pressure applying member or spindle 13 and therefore to read the elastic deformation of the coating element to be tested.

A height adjustable switch 33 is further provided. It is arranged so as to adjust the maximum allowable bending of the coating element under the action of loading determined by the sliding weight 24. When this bending is exceeded before the lever 21 actuates the switch 35 and the return of the testing apparatus is caused, when the coating element does not correspond to the prescribed condition and must be removed, the pin 32 of the switch 33 is actuated so as to stop the pressure generating element or the electric motor 11. The testing apparatus remains in the position it has reached and the element identified as to be rejected is removed and eliminated. In this case the return of the testing apparatus can be caused by actuation of the switch 35 (or a special return switch). In the initial position a switch 34 acts for stopping the testing apparatus. This switch 34 is also height adjustable for adjusting the position to the respective thickness of the coating element.

The above-described apparatus is of course only an arbitrarily selected example. It is to be understood that it is possible to apply the torque which determines the testing pressure not by the displaceable sliding weight, which acts on a lever arm with a length changeable in dependence upon the position of the sliding weight, but by a spring which engages a not length-variable lever arm and has an adjustable tension. In this case the lever which can be designed relatively shorter can extend not in the longitudinal direction of the frame but for example transverse to the same. Also, in this case a turnover switch can be provided at the end of the second not length-variable lever arm.

Instead of the electric motor with the spindle, the pressure generating element can be formed by a hydraulic or pneumatic cylinder-piston unit with a piston rod acting as a pressure-applying member. The pressure can here be continuously read on a manometer. The switching device can be formed in this case by a valve.

The insertion of the coating element can be performed from the longitudinal side of the frame or from its small side. It is advantageous when the support is formed so that the removal takes place at its side opposite to the feeding side. Thereby the test of the coating elements can be performed in a continuous operation, in some cases with utilization of a conveyor. There is also the possibility either to fixedly anchor the support part in the ground on to provide the legs of the support with wheels fixable by a suitable braking device. In the latter case the testing apparatus can be moved to various places when needed.

Figure 2:
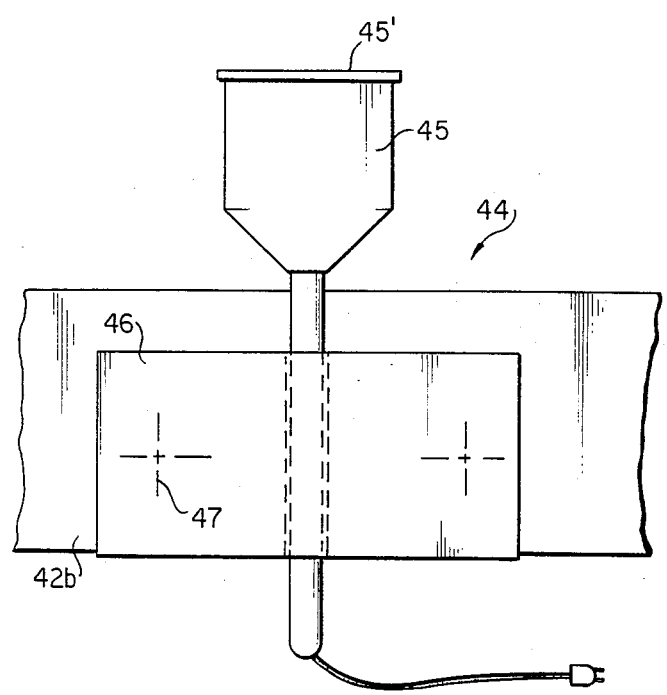
FIG. 2 is a view showing an electrically heated flame stamp for marking the coating elements in the inventive arrangement.

For identifying the tested coating elements it is possible to provide an indicating element for example an electrically heated flame stamp 44 shown in FIG. 2. It can form on the respective coating element a tester mark, a date, a name of a firm or service responsible for testing, as flame produced marks when the coating element corresponds to the safety requirement. Such a flame stamp is provided advantageously at the lower side of the force bar rod 25 or also on one of the supporting bars 42a and 42b and is turned on for example automatically by the switch 35 when it has been determined that the coating element is in order. FIG. 2 shows the flame stamp 44 with a stamp head 45 which contains a heating wire and has a stamping surface. The flame stamp 44 is mounted on the inner roll of the supporting bar 42b with the aid of a clamping plate 46 and screws 47.

Finally it is also possible to conduct tests in such a manner that the loading of the coating element takes place not from above downwardly, but from below upwardly, particularly when the testing load is applied by a spring.

It will be understood that each of the elements described above, or two or more together, may also find a useful application in other types of constructions differing from the types described above.

While the invention has been illustrated and described as embodied in an arrangement and method for determining loading capacity of coating element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of determining loading capacity of coating elements, for example boards or frame panels, comprising the following steps: supporting a coating element to be tested at its both ends;
   placing a force bar along a central transverse line of the coating element, wherein the force bar supports a pivot axle of a two-armed lever;
   producing by one arm of the lever a moment continuously growing from zero, whereas the other arm of the lever serves for producing a fixedly adjustable counter moment corresponding to the permissible maximum loading of the coating element; and
   recording a bending of the coating element in the region of the permissible maximum loading.

2. A method as defined in claim 1, wherein said recording step includes recording of attained permissible maximum loading.

3. A method as defined in claim 1, wherein said recording step includes recording of exceeding of the maximum permissible bending of the coating element.

4. A method as defined in claim 1, wherein said producing step includes hydraulically producing the moment on one arm of the lever.

5. A method as defined in claim 1, wherein said producing step includes pneumatically producing the moment on one arm of the lever.

6. A method as defined in claim 1, wherein said producing step includes electromechanically producing the moment on one arm of the lever.

7. An arrangement as defined in claim 1, and further comprising electrically heatable flame stamping means arranged to provide a mark on the tested coating element.

8. An arrangement for determining loading capacity of coating elements, comprising a support having two ends spaced from one another in a predetermined direction and arranged to support ends of a coating element to be tested; a force bar extending transverse to said direction and arranged to press against the coating element to be tested; a pressure generating element; and a two-lever arm having a pivot axle arranged on said force bar, one arm of said lever being articulately connected with said pressure generating element so that said pressure generating element produces a moment at said arm, whereas on the other arm of said lever a further adjustable moment directed in an opposite direction to the moment generated by said pressure generating element acts; and switching means provided for said pressure generating element and actuated by said other arm of said lever.

9. An arrangement as defined in claim 8, wherein said other arm of said lever has a free end, said switching means being actuated by said free end of said other arm of said lever.

10. An arrangement as defined in claim 8, wherein said pressure generating element is an electrically actuated element.

11. An arrangement as defined in claim 8, wherein said pressure generating element is a hydraulically actuated element.

12. An arrangement as defined in claim 8, wherein said pressure generating element is a pneumatically actuated pressure generating element.

13. An arrangement as defined in claim 8, wherein said pressure generating element includes a pressure source and a displaceable pressure transmitting member; and further comprising adjustable switch means for limiting maximum displacement of said pressure transmitting member.

14. An arrangement as defined in claim 13, wherein said pressure transmitting member is a piston rod, said adjustable switch means including two adjustable limiting switches.

15. An arrangement as defined in claim 8; and further comprising a sliding weight displaceable on said other arm of said lever so as to produce on said other arm the moment acting in opposite direction to the moment produced by the pressure generating element on said one arm of said lever.

16. An arrangement as defined in claim 8; and further comprising a spring which acts upon the other arm of said lever so as to produce on said other arm the moment acting in a direction opposite to the moment produced on the one arm of said lever by said pressure generating element.

17. An arrangement as defined in claim 16, wherein said spring has two ends arranged so that one of said ends of said spring is supported on said support, whereas the other of said ends of said spring is supported on said second arm of said lever.

18. An arrangement as defined in claim 16, wherein said spring has an adjustable tension; and further comprising means for adjusting the tension of said spring.

19. An arrangement as defined in claim 8, wherein said support has a horizontal upper frame; and further comprising two supporting bars arranged to support a coating element to be tested and spaced from one another by a distance which is selectively adjustable in correspondence with the length of the coating element to be tested.

20. An arrangement as defined in claim 19, wherein said force bar is a first supporting bar, whereas said supporting bars are second supporting bars; and further comprising an electrically heatable flame stamp provided on said first suporting bar or on one of said second supporting bars.

* * * * *